(12) United States Patent
Pinault et al.

(10) Patent No.: US 7,125,601 B1
(45) Date of Patent: Oct. 24, 2006

(54) INTEGRATED GRANULE PRODUCT

(75) Inventors: Duane M. Pinault, Cottage Grove, MN (US); Ernest L. Thurber, Woodbury, MN (US); Gregg D. Dahlke, St. Paul, MN (US); Thomas E. Boettcher, Hastings, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 374 days.

(21) Appl. No.: 09/691,352

(22) Filed: Oct. 18, 2000

(51) Int. Cl.
*D06N 7/04* (2006.01)

(52) U.S. Cl. .................................... 428/143; 428/141

(58) Field of Classification Search ........ 428/141–145, 428/150, 403–407, 402.24, 402; 52/415–417, 52/419, 420, 518–560; 427/186–188
See application file for complete search history.

(56) References Cited

U.S. PATENT DOCUMENTS

| | | | | |
|---|---|---|---|---|
| 3,752,696 A | | 8/1973 | Beyard et al. ............... 117/100 |
| 3,937,640 A | * | 2/1976 | Tajima et al. ................. 156/71 |
| 4,547,204 A | | 10/1985 | Caul ............................. 51/298 |
| 4,588,419 A | | 5/1986 | Caul et al. ..................... 51/295 |
| 4,871,376 A | * | 10/1989 | DeWald ....................... 428/143 |
| 5,053,253 A | * | 10/1991 | Haenggi et al. ............. 427/136 |
| 5,206,068 A | * | 4/1993 | Kalkanogu .................. 428/143 |
| 5,258,225 A | * | 11/1993 | Katsamberis ................ 428/331 |
| 5,484,477 A | * | 1/1996 | George et al. ............... 106/499 |
| 5,516,573 A | * | 5/1996 | George et al. ............... 428/143 |
| 5,666,776 A | * | 9/1997 | Weaver et al. ................. 52/557 |
| 5,766,277 A | | 6/1998 | DeVoe et al. ................. 51/295 |
| 5,783,303 A | * | 7/1998 | Tsuei ........................... 428/354 |
| 5,902,683 A | | 5/1999 | Sieloff ......................... 428/412 |
| 6,099,969 A | | 8/2000 | Ogata |
| 6,114,262 A | | 9/2000 | Groh et al. .................. 442/366 |
| 6,238,794 B1 | * | 5/2001 | Beesley et al. .............. 428/403 |
| 6,291,054 B1 | * | 9/2001 | Thomas et al. .............. 428/141 |
| 6,426,309 B1 | | 7/2002 | Miller et al. |

FOREIGN PATENT DOCUMENTS

| | | |
|---|---|---|
| CA | 2270684 | 11/1999 |
| EP | 1 006 094 | 6/2000 |
| WO | WO 00/39418 | 7/2000 |
| WO | WO 00/40794 | 7/2000 |

\* cited by examiner

*Primary Examiner*—Harold Pyon
*Assistant Examiner*—Patricia L Nordmeyer
(74) *Attorney, Agent, or Firm*—Colene H. Blank

(57) ABSTRACT

An integrated granule product that includes a film having a plurality of ceramic coated granules bonded to the film by a cured adhesive. The integrated granule product is generally considered an intermediate product because it is suitable for application onto various substrates for end use applications such as roofing products and flooring products.

20 Claims, 1 Drawing Sheet

INTEGRATED GRANULE PRODUCT

FIELD OF THE INVENTION

The invention relates to an integrated granule product, more particularly to an integrated granule product utilizing ceramic coated granules bonded to either a film with a cured adhesive or a self-supporting adhesive film. The present invention also includes a method of preparing integrated granule products.

BACKGROUND

Roofing products are generally flat or sheet-like materials that can be arranged on a roof to prevent weather, e.g., wind, water, etc., from entering a roof structure. A roofing product can also serve to reflect heat energy from a roof. The roofing product should be durable enough to perform these functions for a number of years. Examples of roofing products include asphalt-based, wooden, or ceramic tile shingles.

Roofing products, particularly those which employ roofing granules, generally have been prepared from a waterproof, durable substrate having roofing granules disposed on a surface of the substrate. Asphalt-based roofing shingles, for example, typically comprise an asphalt-based substrate with roofing granules embedded into the asphalt. The roofing granules are generally colored to provide a desired aesthetic value upon application of the roofing product onto a building. These types of products are prepared by conventional practices generally recognized in the roofing products industry.

There is a continuing need in the roofing product art for new roofing product constructions, and for new processes for preparing roofing products. Conventional roofing products, such as shingles, are often susceptible to weather related damage that can either tear the base substrate or adversely affect the bond of the granule in the asphalt-based substrate. The release of the granules from the base permits the passing of light through to the asphalt. The light can degrade the asphalt and may cause premature failure of the roofing product.

The asphalt-based substrate can adversely affect the aesthetics of the coated granules applied onto the substrate. For example, lighter colored granules may darken upon application to the asphalt-based substrate. The darkening can be attributed to exposed black asphalt in gaps surrounding the granules. Additionally, the lighter color pigments may darken over time after application onto a roof due to the migration of the lower molecular weight materials from the asphalt onto the surface of the coated granules. The aesthetics of a roofing product can also be effected by the undesirable growth of algae on the exposed surface of the roofing product. Algae, growing on the exposed surface of the granules, may have direct access to the asphalt, which provides nutrients that can sustain growth.

It would be an advantage to provide a roofing product that is capable of withstanding severe weather conditions and capable of preventing the degradation of the underlying asphalt-based substrate. It would also be an advantage to provide a roofing product that prevents the discoloration of granules when applied onto an asphalt-based substrate.

SUMMARY OF THE INVENTION

The present invention relates to an integrated granule product. The integrated granule product is suitable for use in various applications that require a layer of ceramic coated granules applied onto a substrate. The integrated granule product of the present invention includes a film having a plurality of ceramic coated granules bonded to the film by a cured adhesive. The integrated granule product is generally considered an intermediate product because it is suitable for application onto various substrates.

In an alternative embodiment, a self-supporting adhesive film is utilized to bond the ceramic coated granules to either roofing or flooring substrates. A self-supporting film is generally defined as a film having uniform width, thickness, and length that when attached along its width to a supporting substrate the film will require no support other than itself or the substrate to which it is attached. The integrated granule product functions as an exposed surface layer on the specified substrates.

The integrated granule product is pliable and durable. The pliability of the intermediate product is determined by the mandrel flexibility test ASTM D228-00. The cured adhesive is also flexible as evidenced by a tensile elongation result of 25% or greater according to ASTM standard D882-97. Additionally, the adhesive of the present invention does not adversely affect the color of the ceramic coated granules.

End use applications of the integrated granule product of the present invention preferably include, for example, roofing products and flooring products.

The present invention further contemplates a process for preparing the integrated granule product wherein a plurality of ceramic coated granules are bonded to a film through the use of a curable adhesive. In a preferred embodiment, the adhesive is first applied onto the film with the ceramic coated granules then applied onto the adhesive. The adhesive is then subjected to a form of energy, such as ultraviolet radiation, thermal radiation, actinic radiation, ionizing radiation, moisture activation, photo-activation, or combinations thereof, to affect curing, chain extension, or both. Additionally, the integrated granule product may be further processed by bonding the integrated granule product to a substrate to form such articles as roofing shingles and flooring materials.

For purposes of the present invention, the following terms used in this application are defined as follows:

"ceramic coated granule" means an inorganic base substrate of generally rock, mineral, or recycled material (e.g. slag) in granular form having a coating which includes an amount of an alkali metal silicate binder sufficient to bind the coating to the inorganic granule;

"cure" means to supply sufficient energy to a composition to alter the physical state of the composition, to make it transform from a fluid to less fluid state, to go from a tacky to a non-tacky state, to go from a soluble to insoluble state, or to decrease the amount of polymerizable material by its consumption in a chemical reaction. The term "cure" may also include the removal of energy or alternatively, the evaporation of a carrier; and "self-supporting" means a property of an article such that a segment of the article having uniform width, thickness, and length when attached along its width to a supporting substrate will require no support other than itself or the substrate to which it is attached. An article will be deemed to be self-supporting if the length of a segment so supported may exceed 5 cm without visible rupture of the segment. Preferably, the minimum length at which a segment of the article ceases to be self-supporting will be greater than 5 m.

Other features and advantages will be apparent from the following description of the preferred embodiments thereof and from the claims.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION

Figure 1:
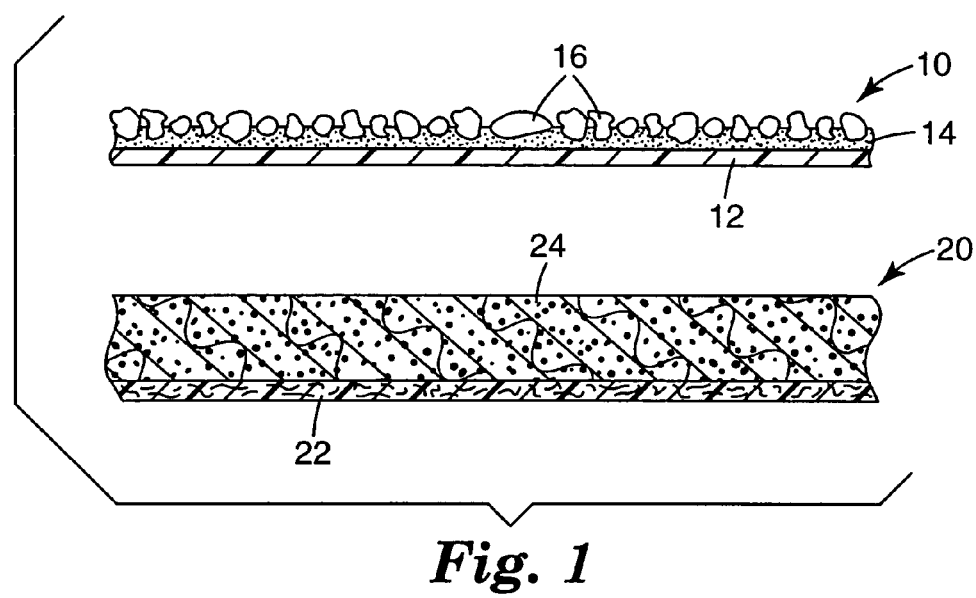
FIG. 1 is a segmented, cross-sectional view of an integrated granule product of the present invention, comprising a film, a cured adhesive, and granules applied onto an asphalt-based substrate.
Figure 2:
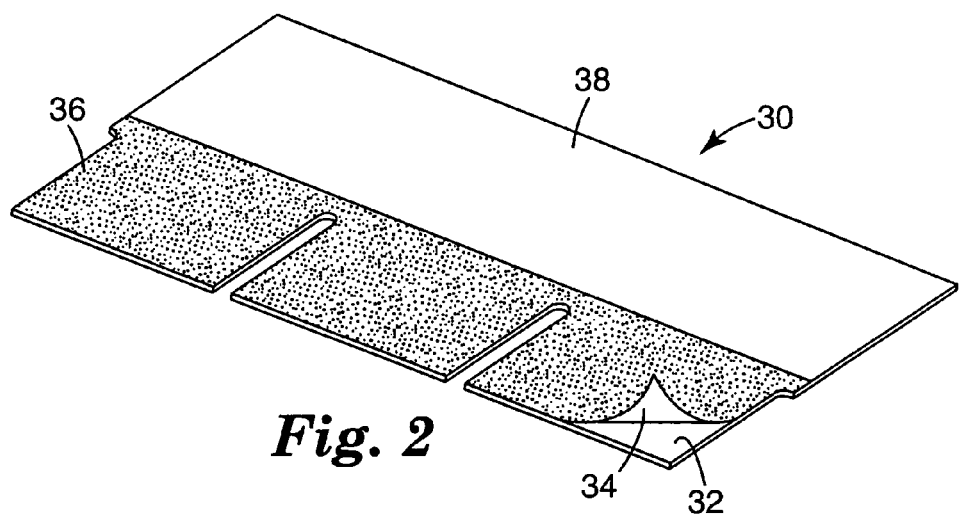
FIG. 2 is a perspective view of a roofing shingle utilizing an embodiment of the present invention.

As depicted in FIG. 1, the integrated granule product 10 includes a film 12, a cured adhesive 14, and a plurality of granules 16 adhered to the film 12 by the cured adhesive 14. The integrated granule product 10 is generally an intermediate product suitable for various end use applications. As used herein, the term "intermediate product," (also referred to herein as "intermediate") means a composite material that has sufficient physical properties including flexibility and durability, that the intermediate, either alone or upon being attached to a substrate, can be processed and fabricated into a useful product. For example, the intermediate product could be utilized in the formation of roofing products or utilized as a floor covering. FIG. 1 depicts an asphalt-based substrate 20 suitable for receiving the integrated granule product 10 of the present invention. The asphalt-based substrate 20 includes a substrate mat 22, saturated with asphalt, and an outer layer of asphalt 24 suitable for receiving the integrated granule product 10. FIG. 2 illustrates one potential use of the integrated granule product 34 as an exposed surface of a roofing shingle 30.

Materials

According to the present invention, the film can be any film material capable of carrying granules adhered to the film with an adhesive. Additionally, the film must be capable of bonding to various substrates for end use applications. Conventional films capable of performing the noted functions are suitable for use with the present invention. Examples of film materials include paper, natural or synthetic fabrics, polymeric materials such as polyethylene terephthalate (PET), polypropylene, polyamide, polyimide or lofty fibrous mats Preferred materials would include polymeric materials, most preferably polyethylene terephthalate (PET) and polypropylene.

In general the films must be provided at a thickness having sufficient compositional strength to act as a support for the coating intermediate. Preferably, the film thickness is about 10 micrometers to about 300 micrometers.

The film may optionally be primed or otherwise treated, e.g., corona treated or surface treated, to improve bonding of an adhesive to the film. Preferred primers include ethylene acrylic acid or aziridine-based compositions.

The adhesive utilized in the present invention can be any non-asphaltic material capable of adhering granules to the film. Additionally, the adhesive properties must allow the adhesive to be processed into an integrated granule film suitable for application onto various substrates. The adhesive is generally a curable material that possesses chemical and mechanical properties to sufficiently bond the granules to the film.

The curable adhesive should have adhesive properties and sufficiently low viscosity at coating temperatures that permit the adhesive to be applied uniformly onto the film or release liner using conventional coating methods. These conventional coating methods include, but are not limited to, roll coating, curtain coating, die coating, knife coating and spray coating. The adhesive can be coated at 100% solids, as an emulsion, as an aqueous dispersion or solvent borne. The coating viscosity of the adhesive can be varied by changing coating temperature, % solids or solvent type. For example, an adhesive, such as Ebecryl 270 from UCB Chemicals of Smyrna, Ga., would generally be knife coated at 100% solids, with a viscosity of about 3,000 centipoise at 60° C. Additionally, the adhesive should be applied at a thickness that enables the application and subsequent bonding of the granules to the film upon curing of the curable adhesive. Preferably the thickness of the adhesive is about 75 micrometers to about 500 micrometers, at 100% solids.

In general, the non-asphaltic adhesive can be of any chemistry that will provide a suitable coating on the film and permit the subsequent bonding of the ceramic coated granules onto the film. Those skilled in the art are capable of selecting a specific adhesive to match film characteristics. Examples of suitable materials include acrylated urethanes, multifunctional acrylate monomers, acrylated epoxies, acrylated polyesters, acrylated polyethers, urethanes, epoxies, acrylics, phenolics, cyanate esters, bismaleimides, hot melts like polyester, polyamides, polyolefins, derivatized polyolefins or combinations thereof. A particularly preferred adhesive includes acrylated aliphatic urethanes, such as Ebecryl 270 from UCB Chemicals Corporation of Smyrna, GA.

Figure 3:
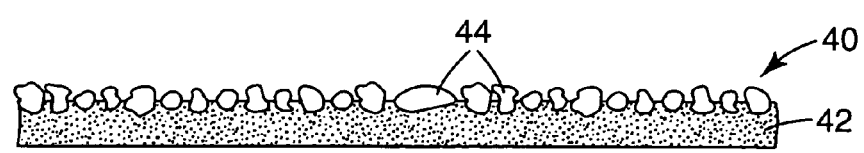
FIG. 3 is a cross-sectional view of another embodiment of the integrated granule product of the present invention.

In an alternative embodiment, the ceramic coated granules may be bonded to a self-supporting film. In this particular embodiment, the adhesive is strong enough to support its own weight and the weight of the ceramic coated granules. In general, the ceramic coated granules are partially embedded into a portion of an exposed surface of the adhesive film. Additionally, the adhesive film is thick enough to provide a bonding surface, opposite the exposed surface utilized for receiving the ceramic coated granules. The self-supporting adhesive film is generally produced utilizing the curable adhesives described for the first embodiment. FIG. 3 depicts the alternative embodiment of an integrated granule product 40 including a self-supporting adhesive film 42 and a plurality of ceramic coated granules 44 partially embedded in the self-supporting adhesive film 42. The self-supporting film may optionally include a release liner (not shown) in the surface opposite the ceramic coated granules.

In accordance with the present invention, initiators and catalysts can optionally be utilized in the curable adhesive composition. In the case of the free radical curable acrylated urethanes, multifunctional acrylates, acrylated polyesters, acrylated polyethers, these adhesives can be cured by free radical photoinitiators or thermal initiators. Examples of useful photoinitiators, which generate a free radical source when exposed to ultraviolet light, include, but are not limited to, organic peroxides, azo compounds, quinones, benzophenones, nitroso compounds, acyl halides, hydrazones, mercapto compounds, pyrylium compounds, triacylimidazoles, acylphosphine oxides, bisimidazoles, chloroalkyltriazines, benzoin ethers, benzil ketals, thioxanthones, and acetophenone derivatives, and mixtures thereof A preferred photoinitiator is "Irgacure 651", which is commercially available from Ciba Specialty Chemicals of Tarrytown, N.Y. Thermal free radical initiators include, but are not limited to, azo, peroxide, persulfate, and redox initiators. In the case of epoxy and urethanes resins these adhesives can be cured by catalysts which include, but are not limited to, tertiary amines, imidazoles, aliphatic amines, cyclic anhydrides, diols, Lewis acids, organotin compounds and photogenerated catalysts like metallocene, and salts of onium cations.

The curable adhesives are cured through the use of conventional curing techniques. For example, the curable adhesive may be cured through the use of ultraviolet radiation, thermal radiation, actinic radiation, ionizing radiation, moisture activation, photo-activation, or combinations thereof. Those skilled in the art are capable of selectively matching adhesives with appropriate curing practices to effectively bond the granules to the film.

Upon curing, the cured adhesive is both flexible and durable. The properties of cured adhesive should be sufficiently flexible to allow the integrated granule product to be further processed into a derivative thereof, e.g., applied to a substrate for end use applications. The flexibility of the adhesive is generally measured through tensile elongation. The cured adhesive, in an unfilled state, is flexible as indicated by a tensile elongation result of 25% or greater according to ASTM standard D882-97.

The adhesive must be durable in order to maintain the bond between the granule and the film for extended period of time. The durability is measured by the industry standard Granule Adhesion to Shingles test, generally recognized in the shingle manufacturing industry. The present invention meets standard requirements under the Granule Adhesion to Shingles test of 0.3 gram loss or less. Because of the desired end use applications, the adhesive must also be capable of withstanding various weather conditions. The failure of the bond between the adhesive and the ceramic coated granules may undesirably exposed the film, and any underlying asphalt-based substrate, to direct light, which can result in premature failure of the roofing product.

Optionally, the adhesive or the film may include other conventional materials to enhance either physical, mechanical or aesthetic properties of the adhesive or the film and the bond between the granules, the adhesive, and the film. Suitable additives may include toughening agents at about 0–10% by weight, pigments at about 0–10% by weight, dyes at about 0–10% by weight, adhesion promoters at about 0–5% by weight, filling agents at about 0–70% by weight or combinations thereof. Additionally, antimicrobials or algaecides may be included in the film or the adhesive in an effective amount to prevent the growth of algea. Those skilled in the art are capable of selecting conventional additives to achieve desired properties in a specific adhesive composition.

In another optional embodiment, either the film, the adhesive or both may include ultraviolet stabilizers, ultraviolet absorbers, antioxidants, or combinations thereof. The noted compounds are generally included in polymeric compositions to prevent transmission of ultraviolet radiation by either absorbing or reflecting the ultraviolet radiation. With the incorporation of the present invention onto an asphalt based substrate, it may be desirable to utilize ultraviolet stabilizers, ultraviolet absorbers, antioxidants, or combinations thereof to prevent the undesirable degradation of the asphalt by ultraviolet radiation. Conventional ultraviolet stabilizers, ultraviolet absorbers, and antioxidants recognized by those skilled in the art are suitable for use in the present invention. An example of an ultraviolet stabilizer includes that available under the trade designation "TINUVINTM 292" (bis(1,2,2,6,6-pentamethyl-4-piperidinyl)sebacate) and an example of an ultraviolet absorber includes that available under the trade designation "TINUVINTM 113 0" (hydroxyphenyl benzotriazole), both of which are available from Ciba-Geigy. The adhesive or film can include an amount of either an ultraviolet stabilizer or an ultraviolet absorber to impart the desired result. Preferably, the ultraviolet stabilizer or absorber is present in an amount up to about 10% by weight. Examples of Antioxidants include, but are not limited to, low melting hindered phenols and triesters. Specific examples include 2,6-di-tert-butyl-4-methylphenol commercially available under the trade designation "ULTRANOXTm 226" antioxidant from Borg Warner Chemicals, Inc., Parkersburg, N.Y.; octadecyl 3,5-di-tert-butyl-4-hydroxycinnamate commercially available under the trade designations "ISONOXTMI32" antioxidant (Schenectady Chemicals, Inc., Schenectady, N.Y.) or "VANOXTMI320" antioxidant (Vanderbilt Co., Inc., Norwalk, Conn.). The adhesive of film compositions can include sufficient amounts of antioxidant to impart the desired result. Preferably, the antioxidant is present in an amount up to about 3% by weight.

The ceramic coated granules utilized in the present invention can be conventional granule materials utilized in such application as roofing products. Such granule materials typically comprise a durable slate or rock base granule, either in natural form or, preferably, coated by an organic or an inorganic coating, e.g., a colored ceramic coating. The ceramic coating may include a variety of ingredients to provide desired aesthetic or anti-microbial properties.

In general, the base granule can be prepared from any mineral material which is dense and properly graded by screening for maximum coverage. Such mineral materials are crushed and graded and optionally and preferably, coated with a colorant, and optionally with other materials such as an antimicrobial material. Preferably, minerals are crushed and screened to a size desirable for use in a chosen roofing product, e.g., to pass a #12 mesh (U.S. Standard) screen and to be retained in a #40 mesh (U.S. Standard) screen. Methods to add a ceramic color coating to base granules are generally disclosed by Beyard et al. in U.S. Pat. No. 3,752,696, incorporated herein by reference.

Suitable base granules can be prepared from a wide class of relatively porous or non-porous and weather-resistant rock or mineral materials, including trap rocks, slates, argillite, greystone, greenstone, quartz, quartzite, certain granites, or certain synthetic granules made from clay or other ceramics.

Commercially available roofing granules useful in products and methods according to the present invention include, for example, the entire line of roofing granules manufactured by Minnesota Mining and Manufacturing Company of St. Paul, Minn.

Preparation of Integrated Granule Product

The integrated granule product of the present invention is generally produced by bonding a plurality of ceramic coated granules onto the film through the use of the curable adhesive. The resulting product is a suitable intermediate for various end use applications.

In the process of the present invention, a film capable of carrying ceramic coated granules is first provided. The film may have been optionally treated with a primer, or other physical method, in order to enhance the bond between the adhesive and the film. The adhesive is then coated onto the film. The optional additives may have been mixed by conventional methods into the adhesive prior to application onto the film. The adhesive is applied by conventional practices such as knife coating techniques. The adhesive is applied at a temperature of about 60° C. to about 100° C. and a viscosity of in the range of 2500 centipoise to about 20,000 centipoise. The temperature is selected at a point low enough to prevent distortion of the film yet provide a suitable viscosity for sufficient application of the adhesive onto the film.

The adhesive is applied at a thickness that permits sufficient holding properties of the granules but does not completely cover the granules. In general, the adhesive is applied at a thickness in the range of about 75 micrometers to about 500 micrometers.

A plurality of ceramic coated granules are then applied onto an exposed surface of the adhesive. The granules can be applied using conventional application methods such as, for example, drop coating techniques. The granules can be applied at varying thicknesses and coverage patterns. For example, the granules can be drop coated onto the adhesive at a rate to provide an even distribution of granules. Generally, the granules are coated to excess to provide the desirable coverage. Additionally, more than one layer of granules or different types of ceramic coated granules may be applied onto the film. One skilled in the art is capable of selecting a coating rate to achieve desired coating coverage over the film.

The coated film is then subjected to a curing step in order to form a cured adhesive and a bond between the film and the granules. The curing may include such conventional practices such as the use of ultraviolet radiation, thermal radiation, actinic radiation, moisture activation, photo-activation, or combinations thereof. The duration and amount of energy applied during the curing step is affected by variables such as, for example, the amount and thickness of adhesive, line speeds, the form of activation energy, and the presence of initiators. Those skilled in the art are capable of matching the appropriate processing conditions to achieve the desired bond between the granules and the film.

The film may be in the form of single sheets of desired dimensions or may include webs or rolls of film wherein the adhesive and ceramic coated granules are applied in a continuous process. With a web based process, the coated film is collected in a web form at the end of the process for end use applications.

The integrated granule product is flexible and durable. The integrated granule product is pliable as determined by mandrel flexibility test procedures as described in the "Examples" section. The process of the present invention results in a composite structure that isolates the ceramic coated granules from the underlying asphalt based substrate. The advantage in separating the ceramic coated granules from the asphalt may prevent the adverse discoloration of the aesthetic color of the ceramic coated granules. The prevention of discoloration is indicated by a one unit or more change in any Hunter color scale coordinates of L*, a*, or b. Preferably, the finished integrated granule product, when utilizing standard white pigmented granules, exhibits an L* value of 64 or greater according to HunterLab spectrocolorimeter test procedures.

Optionally, the film or the adhesive of the present invention include various fillers or pigments in the film to achieve desirable color effects. The use of fillers in the adhesive, or the underlying film, can mask the dark color of the asphalt. For example, white pigments in a film with white granules can produce a significantly lighter, whiter shingle than the gray which can be obtained if the black asphalt shows through the gaps between granules. Similarly, interesting color effects may be obtained by choosing a color or colors, other than the color of the granules, as fillers in the adhesive or film. For example, a patterned film with a clear adhesive may be used to impart desirable shading effects, e.g., wood grain, to the shingle. In a patterned flooring, visual elements such as repeating geometric patterns or logos, etc., may be supplied.

Application of the Integrated Granule Product

The integrated granule product may be applied onto various substrates to form different products. The substrates generally serve as a base for receiving the integrated granule product of the present invention. The base substrate may function as a mechanism for attaching the product to another object. For example, the integrated granule product can be applied onto an asphalt-based substrate to form a roofing shingle. The roofing shingle is then attached to the roof of a building structure. Alternatively, the integrated granule product may be attached directly to a fixed substrate, such as a floor or other stationary building structure.

FIG. 2 depicts a preferred embodiment of the present invention. A three tab shingle 30 is produced using a conventional asphalt-based substrate 32 and the integrated granule film 34 of the present invention. The integrated granule film 34 would serve as the exposed surface of the tab area 36. The headlap area 38 would be covered by a subsequent layer of shingles.

Suitable substrates for the present invention include asphalt-based substrate, metal substrate, polymeric substrate, concrete substrate, tile substrate, fiber substrate, wood substrate or combinations thereof. Preferably, the substrate is an asphalt-based substrate. An asphalt-based substrate ("asphalt substrate" or "substrate") can be any asphalt-based material suitable for use in a roofing product, many of which are well known. In general, substrates may include a non-asphalt-based material in the form of a mat or web ("substrate mat" or "mat") wherein the mat is saturated or coated with asphalt. Various materials may be used as the substrate mat. Preferred materials comprise a non-woven matting of either fiberglass or cellulose fibers. Generally, fiberglass matting is manufactured from a silicate glass fiber blown in a non-woven pattern in streams of about 30–200 micrometers in diameter, with the resultant mat being approximately 1–5 millimeters in thickness. Fiberglass matting is commercially available from Owens-Corning Fiberglass Corporation, Toledo, Ohio, and Manville Roofing Systems, Denver, Colo. In general, most any fiberglass mat with similar physical properties could be incorporated into the product and process of the invention with satisfactory results.

Cellulose felt (dry felt) is typically made from various combinations of rag, wood, and other cellulose fibers or cellulose-containing fibers, blended in appropriate proportions to provide desirable strength, absorption capacity, and flexibility.

Roofing asphalt, sometimes termed "asphalt flux," is a petroleum-based fluid comprising a mixture of bituminous materials.

A cellulose mat is generally soaked or otherwise impregnated or saturated to the greatest possible extent with a "saturant" asphalt. Saturant asphalt is high in oily constituents, and other preservatives, which provide waterproof and weatherproof properties.

The saturated mat is sealed on both sides by application of a hard or more viscous "coating asphalt," which is further protected by a covering of mineral granules. In the case of fiberglass mat-based asphalt roofing products, it is well understood that the coating asphalt can be applied directly to the unsaturated fiberglass mat, without the need for a first application of saturant asphalt.

Saturant asphalt and the coating asphalt can be prepared by processing asphalt flux in such a way as to modify the temperature at which the asphalt will soften. The softening point of saturant asphalt varies from about 37° C. to about 72° C., whereas the softening point of desirable coating asphalt runs as high as about 127° C. The softening temperature may be modified for application to roofing products in varying climates.

A variety of stabilizers and fillers may be included in the either the saturant asphalt of the coating asphalt. For example, silica, slate dust, talc, micaceous materials, dolomite, and trap rock, and calcium carbonate or limestone, may be used as stabilizers or fillers in the coating asphalt. Such materials render the asphalt substrate improved with respect to shatter resistance and shock resistance. In addition, they provide fire protection. Also, they provide raw material cost savings and improved weathering characteristics.

The integrated granule product may be applied to an asphalt-based substrate by heating the substrate to soften the asphalt surface. The film side of the integrated granule product is then applied onto the softened asphalt surface. Generally, the substrate is heated to a temperature in the range of about 150° C. to about 250° C. Upon cooling the film bonds to the asphalt and forms an article suitable for use in roofing applications. The asphalt-based substrate may be provided in either shingle or rolled web form. Thus the end product may also be provided in either form.

The use of the integrated granule product on asphalt-based substrates generally results in a product with improved properties over conventional asphalt singles or roofing products. The present invention, when utilized in a roofing shingle, exhibits a tensile strength according to American Roofing Manufacturers Association Test Index No. 2,126, of greater than 50% over a shingle without the integrated granule product. Additionally, the use of the product of the present invention prevents the asphalt from adversely affecting the aesthetic color of the ceramic coated granules.

The application of the present invention onto flooring substrates preferably includes the use of a polymeric sealant or top coat over the exposed ceramic coated granules. The top coat protects the granules from excessive wear and reduces the abrasive nature of exposed granules. Polymeric sealants include conventional top coat polymers such as, for example, epoxies urethanes, and methacrylates.

EXAMPLES

Example 1

A primed (ethylene-acrylic acid copolymer) 100 micrometer polyethylene teraphthalate film was knife-coated with a commercially available acrylated urethane oligomer (EBECRYL 270 available from UCB Chemicals) and catalyzed with approximately 1% photoinitiator (Irgacure 651 from Ciba Additives) to a thickness of 375 micrometers. White ceramic-coated roofing granules were drop-coated and hand-pressed into the still-liquid resin coating. This construction was then processed through a UV curing station at 6.1 m/min and irradiated with a Fusion Systems "D" bulb (600 W/in). This process yielded a solid, tough granule-containing film material that adheres well when heat-laminated onto asphalt-saturated roofing mats.

Example 2

A primed (ethylene-acrylic acid copolymer) 100 micrometer polyethylene teraphthalate film was knife-coated at 93° C. with a resin mixture of 258 g of Ebecryl 270, 42 g of tripropylene glycol diacrylate, (tripropylene glycol diacrylate is commercially available from UCB Radcure, Syrma, Ga. under the tradename TRPGDA), 306 g of Minspar 3 (Minspar 3 is a feldspar filler available from the K-T Feldspar Corporation, Spruce Pine, N.C.), and 6 g of photoinitiator Irgacure 651 (Irgacure 651 is commercially available from Ciba Specialty Chemicals Tarrytown, N.Y. The resulting coating had a thickness of 375 micrometer. White ceramic-coated roofing granules were drop-coated and hand-pressed into the still-liquid resin coating. This construction was then processed through a UV curing station at 6.1 n/min and irradiated with a Fusion Systems "D" bulb (600 W/in). This process yielded a solid, tough granule-containing film material that adheres well when heat-laminated onto asphalt-saturated roofing mats.

Example 3

A primed (ethylene-acrylic acid copolymer) 100 micrometer polyethylene teraphthalate film was knife-coated at 93° C. with a resin mixture of 80 g of Ebecryl 270, 50 g of Minspar 3, 2 g of White Cloud-60 Lithopone (a white pigment commercially available from Sino-American Pigment Systems, Inc., Berkley, Calif.) and 1 g of Irgacure 651. The resulting coating had a thickness of 375 micrometer. White ceramic-coated roofing granules were drop-coated and hand-pressed into the still-liquid resin coating. This construction was then processed through a UV curing station at 6.1 m/min and irradiated with a Fusion Systems "D" bulb (600 W/in). This process yielded a solid, tough granule-containing film material that adheres well when heat-laminated onto asphalt-saturated roofing mats.

Example 4

The process of Example 1 was utilized in producing a ceramic-coated sand (3M Color Quartz) containing construction by lowering the resin coating thickness from 375 micrometer to 100 micrometer and substituting Color Quartz obtained from Minnesota Mining and Manufacturing of St. Paul, Minn. for the roofing granules. After UV curing, an adhesive coating was then applied to the backside of the PET film to create a tape-type construction. The construction was then applied onto a metal roofing panel.

Examples 5–6

Examples 5 and 6 demonstrate the improved tensile strength of the present invention.

For Example 6, a film was made according to Example 1 was laminated onto an asphalt roofing base material consisting of an asphalt-saturated base web, coated on the weather-exposed side with standard roofing asphalt to form a completed roofing shingle. For Example 5, an identical shingle was used without the film. The ceramic coated granules were drop coated directly onto the asphalt. Samples were prepared according to Asphalt Roofing Industry Bureau Test Procedure 2.224. Specimens measured 15.24 cm by 2.54 cm and represented both film-containing and non-film-containing examples of the shingle web for direct comparison.

The instrument used was an Instron Model 1122 Tensile Tester equipped with a 453.5 Kg load cell, recently calibrated. The sample jaws were set so that 3.81 cm of sample was inserted in the top and bottom clamp and 7.62 cm of sample appeared between the clamps. The instrument was setup to deliver a uniform travel of 30.48 cm per minute for this test. Values were recorded at the instant of sample failure. The test was run on six different times for each Example.

Example 5 exhibited a tensile strength of 10.75 kg/cm. Example 6 demonstrated a tensile strength of 24.57 kg/cm.

Example 7

The integrated granule product of Example 1 was tested for flexibility/pliability under the Mandrel Flexibility Test as defined by ASTM-D228-00 Test Methods For Asphalt Roll Roofing Cap Sheets and Shingles. A 2.54 cm by 20.32 cm specimen was cut from Example 1 and bent through 90 degrees over a 1.27 cm aluminum rounded block as specified in the above method. The specimen passed and did not produce cracking of the cured adhesive portion of the integrated granule product.

Example 8

An integrated granule product was laminated to a web of standard asphalt-impregnated fiberglass shingle mat by coating a 0.158 cm layer of Trumbull asphalt #4110 at 87.7° C. along the entire web width. A 15.24 cm roll of integrated granule product made according to the procedure of Example 1 was laminated, by press-roll, on one side of the web and headlap granules were drop-coated into the liquid asphalt on the remainder of the web to form the completed roofing shingle. The product was then fed into a standard shingle die cutter to obtain individual shingle samples

What is claimed is:

1. An article comprising an integrated granule product bonded to a roofing material substrate, wherein said integrated granule product comprises a film having a plurality of ceramic coated granules, said ceramic coated granules comprising an inorganic base substrate in granular form having a coating which includes an amount of an alkali metal silicate binder sufficient to bind the coating to the inorganic granule, bonded to said film with a cured adhesive, the film bonded to the roofing material substrate.

2. The article of claim 1, wherein said integrated granule product is pliable as determined by mandrel flexibility test procedures according to ASTM D-228-00.

3. The article of claim 1, wherein said film is a polymeric material.

4. The article of claim 1, wherein said cured adhesive is cured through the use of ultraviolet radiation, thermal radiation, actinic radiation, ionizing radiation, moisture activation, photo activation, or combinations thereof.

5. The article of claim 1, wherein said cured adhesive is flexible as indicated by a tensile elongation result of 25% or greater according to ASTM D-882.97.

6. The article of claim 1, wherein said adhesive is selected from acrylated urethanes, multifunctional acrylate monomers, acrylated epoxies, acrylated polyesters, acrylated polyethers, urethanes, epoxies, acrylics, phenolics, cyanate esters, bismaleimides, hot melts of polyester, polyamides, polyolefins, derivatized polyolefins or combinations thereof.

7. The article of claim 1, wherein said adhesive is an acrylated aliphatic urethane.

8. The article of claim 1, wherein said cured adhesive does not adversely affect an aesthetic color of said ceramic coated granules as indicated by a one unit or more change in any HunterLab color scale coordinates of $L^*$, $a^*$, or $b^*$.

9. The article of claim 1, wherein said ceramic coated articles are white and the product exhibits a HunterLab color scale coordinate $L^*$ value of 64 or greater.

10. The article of claim 1, wherein said cured adhesive or said film includes toughening agents, pigments, adhesion promoters, dyes, filling agents, initiators, catalysts, antimicrobials, algaecides, ultraviolet stabilizers, ultraviolet absorbers, antioxidants or combinations thereof.

11. The article of claim 1, wherein said film includes a primer layer.

12. The article of claim 1, wherein the substrate is an asphalt-based substrate, metal substrate, polymeric substrate, concrete substrate, tile substrate, fiber substrate, wood substrate or combinations thereof.

13. The article of claim 1, wherein the article is a roofing shingle or a roll of roofing material.

14. The article of claim 13, wherein said roofing shingle exhibits a tensile strength, according to American Roofing Manufacturers Association Test Index No. 2,126, of greater than 50% over a shingle without said integrated granule product.

15. The article of claim 1, wherein said granules are bonded to said film by a layer of said cured adhesive.

16. The article of claim 1, wherein the integrated granule product forms the exposed surface layer of a roofing material.

17. The article of claim 12, wherein the article is a roofing shingle or a roll of roofing material.

18. An article comprising an integrated granule product bonded to an asphalt-based substrate, wherein integrated granule product comprises a film having a plurality of ceramic coated granules, said ceramic coated granules comprising an inorganic base substrate in granular form having a coating which includes an amount of an alkali metal silicate binder sufficient to bind the coating to the inorganic granule, bonded to said film with a cured adhesive.

19. The article of claim 18, wherein the integrated granule product forms the exposed surface layer of a roofing material.

20. The article of claim 18, wherein the article is a roofing shingle or a roll of roofing material.

* * * * *

UNITED STATES PATENT AND TRADEMARK OFFICE
CERTIFICATE OF CORRECTION

PATENT NO. : 7,125,601 B1  
APPLICATION NO. : 09/691352  
DATED : October 24, 2006  
INVENTOR(S) : Duane M. Pinault It is certified that error appears in the above-identified patent and that said Letters Patent is hereby corrected as shown below:

Column 2,  
Line 66, After "thereof" insert -- , --.

Column 3,  
Line 52 (approx.), After "mats" insert -- . --.

Column 4,  
Line 65, Delete "benzil" and insert -- benzyl --, therefor.  
Line 67, After "thereof" insert -- . --.

Column 5,  
Line 50, Delete "algea." And insert -- algae. --, therefor.

Column 10,  
Line 20, Delete "6.1 n/" and insert -- 6.1m/ --, therefor.  
Line 46 (approx.), Delete "Color Quartz)" and insert -- ColorQuartz) --, therefor.  
Line 48 (approx.), Delete "Color Quartz)" and insert -- ColorQuartz) --, therefor.

Column 11,  
Line 39, After "samples" insert -- . --.

Column 12,  
Line 45, In Claim 18, after "wherein" insert -- said --.

Signed and Sealed this

Twenty-sixth Day of June, 2007

JON W. DUDAS  
*Director of the United States Patent and Trademark Office*